(No Model.)
W. C. McINTIRE.
HANDLE FOR COFFEE POTS OR SIMILAR VESSELS.
No. 420,916. Patented Feb. 4, 1890.
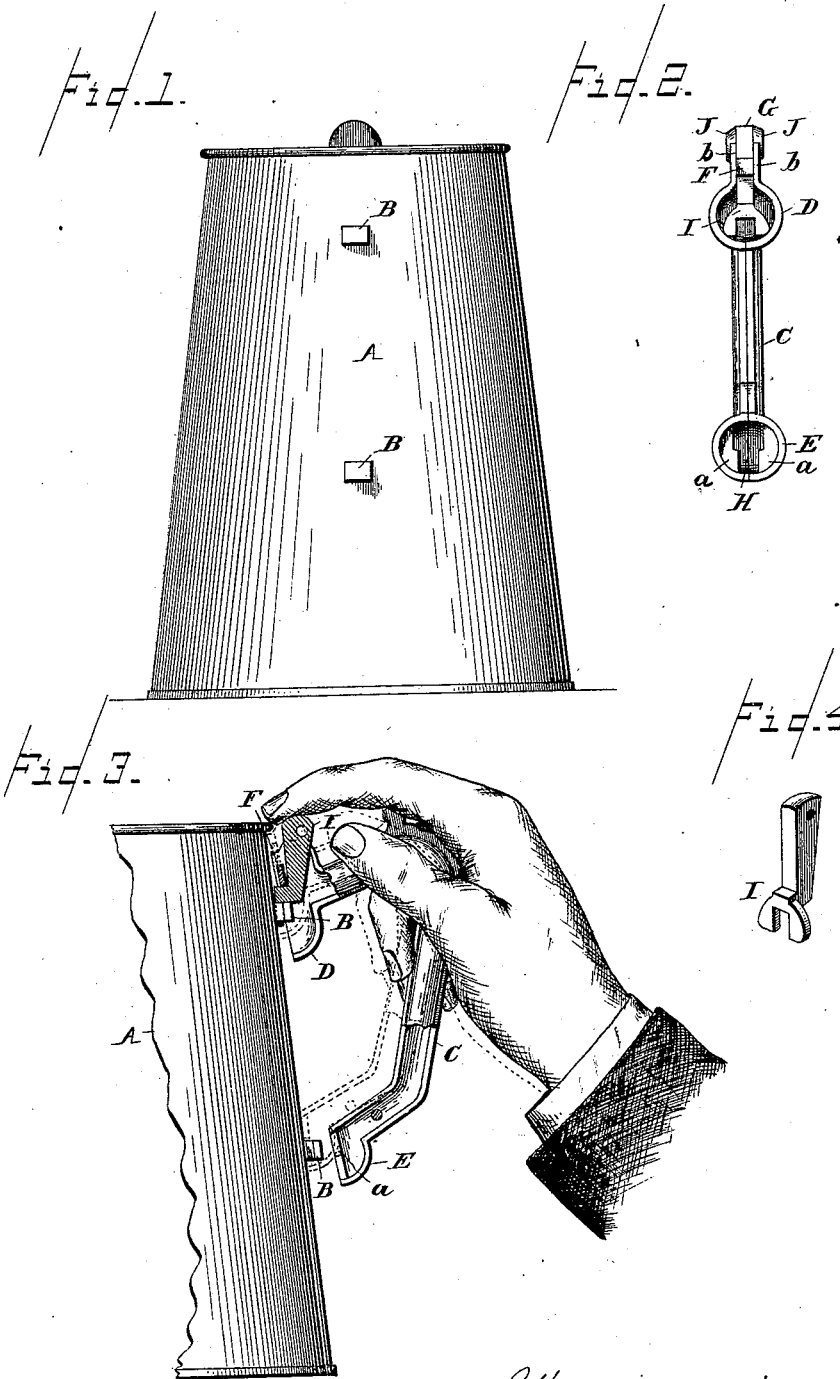
WITNESSES:
Edwin L. Bradford
E. Everett Ellis
Wm. C. McIntire INVENTOR

UNITED STATES PATENT OFFICE.

WILLIAM CRANCH McINTIRE, OF WASHINGTON, DISTRICT OF COLUMBIA, ASSIGNOR TO THE IRON CLAD MANUFACTURING COMPANY, OF NEW YORK, N. Y.

HANDLE FOR COFFEE-POTS OR SIMILAR VESSELS.

SPECIFICATION forming part of Letters Patent No. 420,916, dated February 4, 1890.

Application filed December 2, 1889. Serial No. 332,240. (No model.)

*To all whom it may concern:*

Be it known that I, WILLIAM CRANCH MCINTIRE, a citizen of the United States, residing at Washington, in the District of Columbia, have invented certain new and useful Improvements in Handles for Coffee-Pots or Similar Vessels; and I do hereby declare the following to be a full, clear, and exact description of the invention, such as will enable others skilled in the art to which it appertains to make and use the same.

My invention relates to certain new and useful improvements in detachable handles for coffee-pots, pitchers, &c.

In the manufacture of coffee-pots, pitchers, &c., it is desirable to form the handle separate from the vessel and adapted to be secured in place by the retail dealer or user, and this construction has been found especially desirable in that class of articles known as "enamel ware," for the reason that the handles may be secured with less liability of causing leaks and of marring or destroying the enamel coating of the vessel.

The object of my invention is the production of a handle which may be readily secured in place upon a coffee-pot or similar vessel without the use of special tools or the exercise of any skilled labor; and with this end in view my invention consists of a two-part handle provided at either end with suitable bosses, the lower one having provided therein a T-shaped slot adapted to pass over and interlock a T-headed or other suitably-shaped rivet secured to the body of the vessel, and the upper boss having arranged therein a bifurcated bar adapted to interlock with a T-headed rivet secured to the upper portion of the body of the vessel, the bifurcated bar being held in its locked position (when the handle has been properly located with reference to the vessel) by the pintle which serves to connect the cover-hinge to the handle, as will be hereinafter more fully explained.

In order that those skilled in the art to which my invention appertains may know how to make and use my improved handle, I will describe its construction and the mode of applying the same, referring to the accompanying drawings, in which—

Figure 1 is a rear elevation of an ordinary enamel coffee-pot with T-headed rivets arranged at the proper localities to receive my improved handle. Fig. 2 is a plan view of my improved handle with the bifurcated locking-bar in its locking position. Fig. 3 is a side elevation of a coffee-pot and my improved handle, the latter shown partly in section and in the act of being placed in position; and Fig. 4 is a perspective view of the bifurcated locking-bar.

Similar letters denote like parts in the several figures.

A represents a metallic vessel provided on the rear of the cylinder with T-headed or other suitable rivets B, which are preferably attached to or through the cylinder before the latter is finally finished by enamel or otherwise.

C is the handle struck up from sheet metal or cast in two parts longitudinally and of any desired configuration. This handle is formed at each end with bosses D E, and on one of the halves of the handle there is cast or otherwise formed a bridge F, extending across the space G between the upper portions of the two halves; or, if desirable, one half of such bridge may be formed on each half of the handle. The lower boss E is formed with a web $a$ and a T-shaped slot H, and the upper boss D is formed without such web or slot, both bosses being hollow, as clearly shown.

The two parts of the handle are secured together by any number (preferably two) rivets, and before being thus secured together the bifurcated bar I (shown most clearly at Fig. 4) is arranged in place between the two halves of the handle and behind the bridge F, whereby it is secured against loss or displacement. The bifurcated end of the bar I is intended to subserve in the upper boss the same function that is served in the lower boss E by the T-shaped slot—viz., to embrace the T-headed rivet B. The upper boss D is elongated or extended, as shown at $b\ b$, to form at their extremities a lug J, through which the pintle of cover-hinge passes.

The upper end of the bifurcated bar I is formed with a hole for the passage of the hinge-pintle, and it is so proportioned with reference to the upper boss D of the handle that when the latter is in proper relation with the pot A to be fastened the hole through the bar I is substantially coincident or in register with the pintle-holes in the lug J. If desired, the hole through the bar I may be slightly eccentric to the hole through the lug J, so that the passage of the hinge-pintle will have a tendency to slightly force the bar I downward to produce a binding effect.

At Fig. 3 I have shown the mode of applying the improved handle. To do this the bifurcated bar I is raised to its highest point, as shown in section, and the lower or bifurcated end is forced forward or slightly in advance of the edges of the boss, in which position the bifurcated end is passed over and behind the T-head of the rivet B, the lower boss being held slightly away from the cylinder, as clearly shown, and when the bifurcated bar has been properly located behind the upper rivet B the lower boss is forced toward the cylinder, the T-head rivet on the cylinder passing through the wide portion of the T-slot $a$ in the web of the boss. The handle is then raised bodily to bring the narrow portion of the slot $a$ in the web of the lower boss behind the head of the rivet B, and the upper extremity or lug J of the handle is brought about coincident with the upper edge of the pot A, as clearly shown in dotted lines. The bar I, being held down while the handle is raised, brings the hole through the upper end of said bar into proper alignment with the holes in the lug J to permit the passage of the hinge-pintle.

The cover or lid of the pot may be provided with any of the well-known forms of bifurcated hinges, and when said hinge has been secured to the lug J of the handle the bifurcated locking-bar I and handle C will be immovably secured in place.

I have shown and described the upper boss D of the handle as provided with the bridge F, confining the locking-bar I in the extension, and I prefer this construction; but it will of course be understood that I do not wish to be confined to the employment of such bridge, as it will readily appear that when the lower bifurcated end of the bar I is placed behind the T-headed rivet and the upper end is secured by the hinge-pintle the parts will be all locked in their proper relation. The employment of the bridge F, however, lessens the leverage strain, and also serves to lock the bar I in place and avoids loosening or displacing the same.

Another application, Serial No. 332,241, filed by me concurrently with this, shows and describes another form of device for securing the handle in place, and I do not wish the device shown herein to be confounded with such other device.

What I herein claim as new, and desire to secure by Letters Patent, is—

1. A detachable handle for coffee-pots or similar vessels, composed of two parts secured together longitudinally and provided at each end with the bosses D E, constructed as described, the upper boss D, elongated and provided with lug J, and bridge F, in combination with the loose and movable bifurcated locking-bar I, substantially as and for the purposes described.

2. In combination with a coffee-pot or other vessel provided with T-headed rivets B, the two-part handle C, provided with the bosses D E, constructed as described, the bridge F, lug J, and locking-bar I, the several parts secured in position by a single pintle, as hereinbefore set forth.

3. A detachable handle for coffee-pots or similar vessels, provided at each end with bosses D E, constructed as described, the upper boss D, elongated and provided with the lug J, in combination with the movable bifurcated bar I, substantially as and for the purpose described.

In testimony whereof I affix my signature in presence of two witnesses.

WM. CRANCH McINTIRE.

Witnesses:
D. G. STUART,
D. P. COWL.